(12) United States Patent
Christmas

(10) Patent No.: US 10,061,267 B2
(45) Date of Patent: Aug. 28, 2018

(54) LIGHTING DEVICE FOR HEADLIGHTS WITH A PHASE MODULATOR

(71) Applicant: Envisics Ltd., Buckinghamshire (GB)

(72) Inventor: Jamieson Christmas, Buckinghamshire (GB)

(73) Assignee: Envisics Ltd., Buckinghamshire (GB)

( * ) Notice: Subject to any disclaimer, the term of this patent is extended or adjusted under 35 U.S.C. 154(b) by 0 days.

(21) Appl. No.: 15/372,312

(22) Filed: Dec. 7, 2016

(65) Prior Publication Data

US 2017/0082974 A1    Mar. 23, 2017

Related U.S. Application Data

(63) Continuation of application No. 14/376,974, filed as application No. PCT/GB2013/050274 on Feb. 6, 2013, now Pat. No. 9,829,858.

(30) Foreign Application Priority Data

Feb. 7, 2012 (GB) .................................. 1202123.4

(51) Int. Cl.
*B60Q 1/00* (2006.01)
*G03H 1/00* (2006.01)
(Continued)

(52) U.S. Cl.
CPC .............. *G03H 1/0005* (2013.01); *B60Q 1/06* (2013.01); *B60Q 1/085* (2013.01); *B60Q 1/12* (2013.01);
(Continued)

(58) Field of Classification Search
CPC ...................................................... F21S 41/25
See application file for complete search history.

(56) References Cited

U.S. PATENT DOCUMENTS

| 4,275,454 A | 1/1981 | Klooster, Jr. |
| 5,003,166 A | 3/1991 | Girod |

(Continued)

FOREIGN PATENT DOCUMENTS

| EP | 0660139 A1 | 6/1995 |
| EP | 0807830 A1 | 11/1997 |

(Continued)

OTHER PUBLICATIONS

"U.S. Appl. No. 14/376,974, Final Office Action dated Oct. 17, 2016", 9 pgs.

(Continued)

*Primary Examiner* — Sean Gramling
(74) *Attorney, Agent, or Firm* — McDonnell Boehnen Hulbert & Berghoff LLP

(57) ABSTRACT

There is provided a lighting device arranged to produce a controllable light beam for illuminating a scene. The device comprises an addressable spatial light modulator arranged to provide a selectable phase delay distribution to a beam of incident light. The device further comprises fourier optics arranged to receive phase-modulated light from the spatial light modulator and form a light distribution. The device further comprises projection optics arranged to project the light distribution to form a pattern of illumination as said controllable light beam.

18 Claims, 7 Drawing Sheets

(51) Int. Cl.

| | | |
|---|---|---|
| *G03H 1/22* | (2006.01) | |
| *G06K 9/00* | (2006.01) | |
| *G01S 17/89* | (2006.01) | |
| *G01S 17/93* | (2006.01) | |
| *B60Q 1/08* | (2006.01) | |
| *B60Q 1/12* | (2006.01) | |
| *G01S 7/481* | (2006.01) | |
| *G06K 9/20* | (2006.01) | |
| *B60Q 1/16* | (2006.01) | |
| *G01S 7/491* | (2006.01) | |
| *G08G 1/16* | (2006.01) | |
| *B60Q 1/06* | (2006.01) | |
| *F21S 41/12* | (2018.01) | |
| *F21S 41/125* | (2018.01) | |
| *F21S 41/13* | (2018.01) | |
| *F21S 41/14* | (2018.01) | |
| *F21S 41/20* | (2018.01) | |
| *F21S 41/25* | (2018.01) | |
| *F21S 41/27* | (2018.01) | |
| *F21S 41/60* | (2018.01) | |
| *F21S 41/64* | (2018.01) | |
| *F21S 43/13* | (2018.01) | |
| *F21S 43/20* | (2018.01) | |
| *F21S 41/16* | (2018.01) | |
| *G03H 1/02* | (2006.01) | |

(52) U.S. Cl.
CPC ............... *B60Q 1/16* (2013.01); *F21S 41/12* (2018.01); *F21S 41/125* (2018.01); *F21S 41/13* (2018.01); *F21S 41/14* (2018.01); *F21S 41/16* (2018.01); *F21S 41/25* (2018.01); *F21S 41/27* (2018.01); *F21S 41/285* (2018.01); *F21S 41/60* (2018.01); *F21S 41/645* (2018.01); *F21S 43/13* (2018.01); *F21S 43/26* (2018.01); *G01S 7/4814* (2013.01); *G01S 7/4911* (2013.01); *G01S 7/4915* (2013.01); *G01S 17/89* (2013.01); *G01S 17/936* (2013.01); *G03H 1/02* (2013.01); *G03H 1/2249* (2013.01); *G03H 1/2294* (2013.01); *G06K 9/00791* (2013.01); *G06K 9/2036* (2013.01); *G08G 1/16* (2013.01); *B60Q 2300/056* (2013.01); *B60Q 2300/122* (2013.01); *B60Q 2300/312* (2013.01); *B60Q 2300/32* (2013.01); *B60Q 2300/322* (2013.01); *B60Q 2300/33* (2013.01); *B60Q 2300/331* (2013.01); *B60Q 2300/42* (2013.01); *B60Q 2300/45* (2013.01); *G03H 2001/0212* (2013.01); *G03H 2001/0216* (2013.01); *G03H 2001/0224* (2013.01); *G03H 2001/2263* (2013.01); *G03H 2001/2271* (2013.01); *G03H 2001/2284* (2013.01); *G03H 2001/2297* (2013.01); *G03H 2210/20* (2013.01); *G03H 2210/22* (2013.01); *G03H 2222/16* (2013.01); *G03H 2222/17* (2013.01); *G03H 2223/26* (2013.01); *G03H 2223/55* (2013.01); *G03H 2225/25* (2013.01); *G03H 2225/32* (2013.01); *G03H 2225/52* (2013.01); *G03H 2225/61* (2013.01); *G03H 2226/05* (2013.01)

(56) References Cited

U.S. PATENT DOCUMENTS

| | | | |
|---|---|---|---|
| 7,227,611 B2 | 6/2007 | Hull et al. | |
| 8,072,488 B2 | 12/2011 | Cable et al. | |
| 8,085,453 B2 | 12/2011 | Christmas et al. | |
| 8,159,733 B2 | 4/2012 | Christmas et al. | |
| 8,654,048 B2 | 2/2014 | Collings et al. | |
| 8,878,759 B2 | 11/2014 | Crossland et al. | |
| 2001/0050787 A1 | 12/2001 | Crossland et al. | |
| 2002/0005778 A1 | 1/2002 | Breed | |
| 2002/0060831 A1 | 5/2002 | Gerchberg | |
| 2004/0027626 A1 | 2/2004 | Yamauchi et al. | |
| 2004/0042161 A1 | 3/2004 | Cameron et al. | |
| 2004/0218401 A1* | 11/2004 | Okubo ................. B60Q 1/085 362/526 |
| 2005/0041271 A1 | 2/2005 | Tomoyoshi | |
| 2005/0134709 A1 | 6/2005 | Ishii et al. | |
| 2005/0157188 A1 | 7/2005 | Kubo | |
| 2007/0024999 A1 | 2/2007 | Crossland et al. | |
| 2007/0252918 A1* | 11/2007 | Furuya ................ H04N 9/3129 348/742 |
| 2008/0068852 A1 | 3/2008 | Goihl | |
| 2008/0106653 A1 | 5/2008 | Harris | |
| 2008/0192312 A1 | 8/2008 | Hendricks et al. | |
| 2008/0198372 A1 | 8/2008 | Pan | |
| 2008/0212040 A1 | 9/2008 | Aksyuk | |
| 2009/0002787 A1* | 1/2009 | Cable ................... G03H 1/2294 359/9 |
| 2009/0128875 A1 | 5/2009 | Christmas et al. | |
| 2009/0257104 A1 | 10/2009 | Cable et al. | |
| 2010/0165429 A1 | 7/2010 | Buckley et al. | |
| 2011/0002019 A1 | 1/2011 | Routley et al. | |
| 2011/0157667 A1 | 6/2011 | Lacoste et al. | |
| 2011/0188251 A1 | 8/2011 | Kalms et al. | |
| 2012/0133937 A1 | 5/2012 | Heintzmann et al. | |
| 2013/0022222 A1 | 1/2013 | Zschau et al. | |
| 2013/0194644 A1 | 8/2013 | Cable et al. | |
| 2013/0265622 A1 | 10/2013 | Christmas et al. | |
| 2014/0240378 A1* | 8/2014 | Fujioka ............... G02B 27/1066 345/690 |
| 2014/0253987 A1 | 9/2014 | Christmas | |
| 2015/0009695 A1 | 1/2015 | Christmas et al. | |
| 2015/0022526 A1 | 1/2015 | Christmas | |
| 2015/0346491 A1 | 12/2015 | Christmas et al. | |

FOREIGN PATENT DOCUMENTS

| | | |
|---|---|---|
| EP | 2269869 A1 | 1/2011 |
| GB | 2436676 A | 10/2007 |
| GB | 2438026 A | 11/2007 |
| GB | 2446852 A | 8/2008 |
| GB | 2461294 A | 12/2009 |
| GB | 2509180 A | 6/2014 |
| JP | 06027863 | 2/1994 |
| JP | 11003128 A | 6/1999 |
| JP | 2003515180 A | 4/2003 |
| JP | 2004538519 A | 12/2004 |
| JP | 2005181854 A | 7/2005 |
| JP | 2006301020 A | 11/2006 |
| JP | 2007523359 A | 8/2007 |
| JP | 2008544307 A | 12/2008 |
| JP | 2009536748 A | 10/2009 |
| JP | 2011508911 A | 3/2011 |
| JP | 2013524270 A | 6/2013 |
| WO | WO-0135155 A1 | 5/2001 |
| WO | WO-03014837 A1 | 2/2003 |
| WO | WO-2003060612 A1 | 7/2003 |
| WO | WO-2005059881 A2 | 6/2005 |
| WO | WO-2006134404 A1 | 12/2006 |
| WO | WO-2007131649 A1 | 11/2007 |
| WO | WO-2007131650 A1 | 11/2007 |
| WO | WO-2009087358 A1 | 7/2009 |
| WO | WO-2009156752 A1 | 12/2009 |
| WO | WO-2010058323 A1 | 5/2010 |
| WO | 2013094011 | 6/2013 |
| WO | WO-2013117923 | 8/2013 |

OTHER PUBLICATIONS

"U.S. Appl. No. 14/376,974, Non Final Office Action dated May 18, 2016", 11 pgs.
"U.S. Appl. No. 14/376,974, Non Final Office Action dated Jul. 14, 2016", 10 pgs.

(56) References Cited

OTHER PUBLICATIONS

"U.S. Appl. No. 14/376,974, Preliminary Amendment dated Aug. 6, 2014", 6 pgs.

"U.S. Appl. No. 14/376,974, Preliminary Amendment dated Nov. 17, 2014", 4 pgs.

"U.S. Appl. No. 14/376,974, Response filed Sep. 16, 2016 to Non Final Office Action dated Jul. 14, 2016", 11 pgs.

"Great Britain Application Serial No. 1118558.4, Search Report dated Mar. 21, 2012", 6 pgs.

"Great Britain Application Serial No. 1202123.4, Search Report dated Jun. 19, 2013", 8 pgs.

"Great Britain Application Serial No. 1206496.0, Search Report dated Oct. 1, 2012", 6 pgs.

"International Application Serial No. PCT/GB2011/051328, International Search Report dated Sep. 21, 2011", 5 pgs.

"International Application Serial No. PCT/GB2011/051328, Written Opinion dated Sep. 21, 2011", 8 pgs.

"International Application Serial No. PCT/GB2012/052566, International Search Report dated Dec. 14, 2012", 6 pgs.

"International Application Serial No. PCT/GB2012/052566, Written Opinion dated Dec. 14, 2012", 8 pgs.

"International Application Serial No. PCT/GB2013/000167, International Search Report dated Jul. 22, 2013", 3 pgs.

"International Application Serial No. PCT/GB2013/000167, Written Opinion dated Jul. 22, 2013", 7 pgs.

"International Application Serial No. PCT/GB2013/050274, International Preliminary Report on Patentability dated Aug. 21, 2014", 12 pgs.

"International Application Serial No. PCT/GB2013/050274, International Search Report dated May 7, 2013", 4 pgs.

"International Application Serial No. PCT/GB2013/050274, Written Opinion dated May 7, 2013", 10 pgs.

"Japanese Application Serial No. 2014-537712, Office Action dated Mar. 17, 2015", 5 pgs.

"Japanese Application Serial No. 2014-537712, Office Action dated Sep. 30, 2014", 6 pgs.

Buckley, E, et al., "Full Colour Holographic Laser Projector HUD", SID Vehicles and Photons 2008, 15th Annual Symposium on Vehicle Displays, (Oct. 17, 2008), 5 pgs.

Ferri, L C, "Visualization of 3D Information with Digital Holography Using Laser Printers", Computers & Graphics, (2001), 309-321.

Francesco, Difato, et al., "Spatial Light Modulators for Complex Spatiotemporal Illumination of Neuronal Networks", Neuromethods, (Dec. 9, 2011), 61-81 pgs.

Fukaya, N, et al., "Improved Electro-Holographic Display Using Liquid Crystal Devices to Diminish the System Size", Proceedings ofInternational Conference on High Technology: Image Science and Technology, Evolution and Promise, World Techno Fair in Chiba, (Sep. 11, 1996), 355-363.

Inoue, T, et al., "LCOS Spatial Light Modulator Controlled by 12-Bit Signals for Optical Phase-Only Modulation", Proceedings of SPIE, International Society for Optical Engineering, vol. 6487, (2007), 11 pgs.

Miao, et al., "Phase Retrieval from the magnitude of the Fourier transforms of nonperiodic objects", J. Opt. Soc. Am., vol. 15, No. 6, (Jun. 1998), 1662-1669.

Mias, S, et al., "A Review of Active Optical Devices: II. Phase Modulation", Journal of Micromechanics and Microengineering, (2008), 1-22.

U.S. Appl. No. 14/376,974, filed Aug. 6, 2014, Lighting Device for Headlights with a Phase Modulator, Publication No. US 20150009695, pending.

U.S. Appl. No. 15/364,173, filed Nov. 29, 2016, Lighting Device for Headlights with a Phase Modulator, Publication No. US 20170074985, pending.

U.S. Appl. No. 15/372,312, filed Dec. 7, 2016, Lighting Device for Headlights with a Phase Modulator, Publication No. US 20170082974, pending.

U.S. Appl. No. 15/372,337, filed Dec. 7, 2016, Lighting Device for Headlights with a Phase Modulator, Publication No. US 20170080848, pending.

Copending U.S. Appl. No. 14/376,974, filed Aug. 6, 2014.
Copending U.S. Appl. No. 15/364,173, filed Nov. 29, 2016.
Copending U.S. Appl. No. 15/372,337, filed Dec. 7, 2016.

\* cited by examiner

LIGHTING DEVICE FOR HEADLIGHTS WITH A PHASE MODULATOR

RELATED APPLICATIONS

This application is a continuation of U.S. patent application Ser. No. 14/376,974, filed on Aug. 6, 2014, which is a U.S. National Stage Filing under 35 U.S.C. 371 International Application No. PCT/GB2013/050274, filed Feb. 6, 2013, and published as WO/2013/117923 on Aug. 15, 2013, which designates the U.S., published in English, and claims priority under 35 U.S.C. §§ 119 or 365(c) to Great Britain Application No. 1202123.4, filed Feb. 7, 2012.

FIELD OF THE DISCLOSURE

The present disclosure relates to the field of illumination. Examples disclosed herein generally relate to a vehicle headlamp using a spatial light modulator.

BACKGROUND

Light scattered from an object contains both amplitude and phase information. This amplitude and phase information can be captured on, for example, a photosensitive plate by well known interference techniques to form a holographic recording, or "hologram", comprising interference fringes. The "hologram" may be reconstructed by illuminating it with suitable light to form a holographic reconstruction, or image, representative of an original object, for example.

It has been found that a holographic reconstruction of acceptable quality for viewing an image of the object can be formed from a "hologram" containing only phase information related to the original object. Such holographic recordings may be referred to as phase-only holograms.

The term "hologram" therefore relates to the recording which contains information about an object and can be used to form a reconstruction. The hologram may contain information in the frequency, or Fourier, domain.

Computer-generated holography may numerically simulate the interference process, using Fourier techniques for example, to produce a computer-generated phase-only hologram. A computer-generated phase-only hologram may be used to produce a holographic reconstruction.

It has been proposed to use holographic techniques in an illumination system. The system may accept a temporal sequence of 2D illumination distributions as an input. The input may be converted into a real-time sequence of corresponding holograms (for example, phase-only holograms) wherein each hologram corresponds to one image frame. The holograms may be reconstructed in real-time to produce a 2D projection representative of the input. Accordingly, there may be provided a real-time 2D projector to project a sequence of frames using a sequence of computer-generated holograms.

An advantage of projecting video images or light distributions via phase-only holograms is the ability to control many reconstruction attributes via the computation method—e.g. the aspect ratio, resolution, contrast and dynamic range of the projected light. A further advantage of phase-only holograms is that substantially no optical energy is lost by way of amplitude modulation.

A computer-generated phase-only hologram may be "pixellated". That is, the phase only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal on silicon (LCOS) spatial light modulator (SLM). The LCOS may be reflective meaning that modulated light is output from the LCOS in reflection.

Each phase modulating element, or pixel, may vary in state to provide a controllable phase delay to light incident on that phase modulating element. An array of phase modulating elements, such as a LCOS SLM, may therefore represent (or "display") a computationally determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave by illuminating the LCOS SLM, for example. The position of the reconstruction in space may be controlled by using a optical Fourier transform lens, to form a holographic reconstruction, or "image", in the spatial domain.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image or light distribution). That is, phase information related to the object may be "retrieved" from intensity, or amplitude, only information in the spatial domain. Accordingly, a phase-only holographic representation of an object in the Fourier domain may be calculated.

The holographic reconstruction may be formed by illuminating the Fourier domain hologram and performing an optical Fourier transform using a Fourier transform lens, for example, to form an image (holographic reconstruction) at a reply field such as on a screen.

FIG. 1 shows an example of using a reflective SLM, such as a LCOS, to produce a holographic reconstruction at a replay field location.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (i.e. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens receives (phase modulated) light from the SLM and performs a frequency-space transformation to produce a holographic reconstruction at the screen (125) in the spatial domain.

In this process, the light from the light source is generally evenly distributed across the SLM (140), and across the phase modulating layer (array of phase modulating elements). Light exiting the phase-modulating layer may be distributed across the screen. There is no correspondence between a specific image region of the screen and any one phase-modulating element.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds good solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

There have been disclosed various techniques for providing improved 2D image projection systems using a computer-generated hologram and these may also be applied to light distributions used in illumination applications.

SUMMARY

In one aspect dynamically varying holograms are used to provide controlled illumination of a desired part of a scene.

In another aspect there is provided a method of illuminating a scene comprising forming a varying set of phase distributions on a spatial light modulator, illuminating the spatial light modulator to provide an exit beam, applying the exit beam to Fourier optics to form an image and projecting the image to provide a scene-illuminating beam The method may comprise selecting the set to steer the scene illuminating beam The method may comprise selecting the set to illuminate chosen areas of the scene while not illuminating other areas.

The method may comprise reading pre-calculated phase distributions from a memory.

The spatial light modulator may be an LCOS SLM.

In another aspect, there is provided a lighting device arranged to produce a controllable light beam for illuminating a scene, the device comprising: an addressable spatial light modulator arranged to provide a set of selectable phase delay distributions to a beam of incident light; Fourier optics arranged to receive phase-modulated light from the spatial light modulator and form an image; and projection optics arranged to project the image to form a pattern of illumination as said controllable light beam.

The Fourier lens is arranged to form a light distribution at a replay field which in some cases may be considered an "image". It can be understood from the present disclosure that the light distribution at the replay field of the Fourier lens may not a real image in space.

In summary, the present disclosure relates to using a computer-generated phase-only hologram to produce a light distribution for an illumination device such as a headlamp. The holographic reconstruction (or reconstructed image) is projected using projection optics to produce a light distribution in space. For example, the holographic reconstruction may be projected on a road, for example, to produce a light distribution suitable for night time driving. Since the computer-generated hologram may be readily or quickly changed, the projected light distribution may be dynamically changed. For example, the projected light distribution may be moved or steered. The system may therefore be incorporated into the headlights of a motor vehicle to provide controllable illumination. The computer-generated hologram may be changed in real-time to provide dynamically varying illumination for a driver, for example. The computer-generated hologram may be changed in response to road or driving conditions, for example.

BRIEF DESCRIPTION OF THE DRAWINGS

In the drawings.

In the figures, like reference numerals referred to like parts.

DETAILED DESCRIPTION OF THE DRAWINGS

Holographically generated 2D images are known to possess significant advantages over their conventionally projected counterparts, especially in terms of definition and efficiency. However, the computational and hardware complexity of the current hologram generation algorithms previously precluded their use in real-time applications. Recently these problems have been solved—see, for example, published PCT application WO 2005/059881 incorporated herein by reference.

Modified algorithms based on Gerchberg-Saxton have been developed—see, for example, co-pending published PCT application WO 2007/131650 incorporated herein by reference.

These improved techniques are able to calculate holograms at a sufficient speed that 2D video projection is realised. Examples described herein relate to projection using a computer-generated hologram calculated using such a modified Gerchberg-Saxton algorithm.

Figure 2:
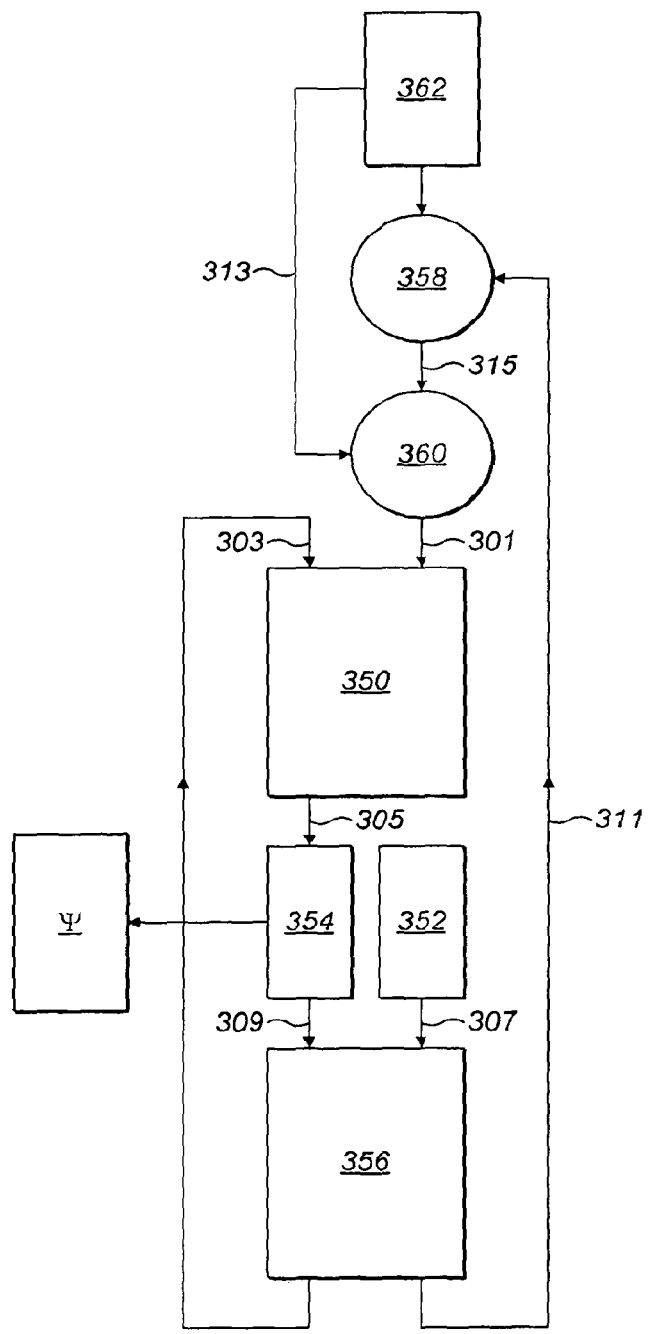
FIG. 2 is a chart showing the function of a modified Gerchberg-Saxton algorithm.

FIG. 2 shows a modified algorithm which retrieves the phase information $\psi[x,y]$ of the Fourier transform of the data set which gives rise to a known amplitude information $T[x,y]$ 362. Amplitude information $T[x,y]$ 362 is representative of a target image (e.g. a photograph). The phase information $\psi[x,y]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provided feedback on both the amplitude and the phase information.

The algorithm shown in FIG. 2 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates x and y and can be considered amplitude and phase distributions.

Referring to FIG. 2, processing block 350 produces a Fourier transform from a first data set having magnitude information 301 and phase information 303. The result is a second data set, having magnitude information and phase information $\psi_n[x,y]$ 305. The amplitude information from processing block 350 is set to a distribution representative of the light source but the phase information $\psi_n[x,y]$ 305 is retained. Phase information 305 is quantised by processing block 354 and output as phase information $\psi[x,y]$ 309. Phase information 309 is passed to processing block 356 and combined with the new magnitude by processing block 352. The third data set 307, 309 is applied to processing block 356 which performs an inverse Fourier transform. This produces a fourth data set $R_n[x,y]$ in the spatial domain having amplitude information $|R_n[x, y]|$ 311 and phase information $\angle R_n[x, y]$ 313.

Starting with the fourth data set, its phase information 313 forms the phase information of a fifth data set, applied as the first data set of the next iteration 303'. Its amplitude information $R_n[x,y]$ 311 is modified by subtraction from amplitude information $T[x,y]$ 362 from the target image to produce an amplitude information 315 set. Scaled amplitude information 315 (scaled by cc) is subtracted from target amplitude information $T[x,y]$ 362 to produce input amplitude information $\eta[x,y]$ 301 of the fifth data set for application as first data set to the next iteration. This is expressed mathematically in the following equations:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

Where:
F' is the inverse Fourier transform.
F if the forward Fourier transform.
R is the replay field.
T is the target image.
$\angle$ is the angular information.
$\psi$ is the quantized version of the angular information.
$\varepsilon$ is the new target magnitude, $\varepsilon \geq 0$
$\alpha$ is a gain element ~1

The gain element a may be selected based on the size and rate of the incoming target image data.

Figure 3:
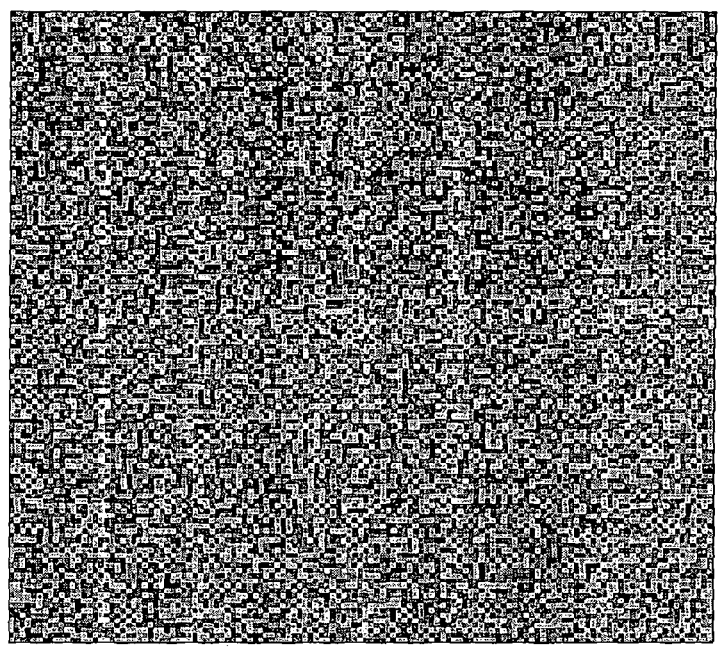
FIG. 3 shows an example random phase seed for the first iteration of the algorithm of FIG. 2.

In the absence of phase information from the preceding iteration, in this example, the first iteration of the algorithm uses a random phase generator to supply phase information as a starting point. FIG. 3 shows an example random phase seed.

In an alternative example, the resultant amplitude information from processing block 350 is not discarded. The target amplitude information 362 is subtracted from amplitude information to produce new amplitude information. A multiple, typically a multiple less than unity, of the new amplitude information is subtracted from amplitude information 362 to produce the input amplitude information for processing block 356.

Further alternatively, the phase is not fed back in full and only a portion proportion to its change over the last few, for example two, iterations is fed back.

Such techniques have been developed for real-time video projectors in which the holograms are calculated in real-time from input video data, for example. However, in examples set out in the present disclosure, it is not essential to calculate the hologram or holograms in real-time.

In examples, the computer-generated holograms are pre-calculated. A finite number of predetermined computer-generated holograms is stored in local memory. This is possible since only a finite small number of predetermined holograms are required by the system.

The skilled person will therefore understand that any technique for calculating the phase-only hologram is therefore suitable. For example, the hologram may equally be calculated by the techniques known as Direct Binary Search or Simulated Annealing.

However, in the described examples, the holograms are calculated by the Gerchberg-Saxton algorithm or a modified version of the Gerchberg-Saxton algorithm.

The present disclosure relates to using computer-generated holograms to provide a controllable light distribution for an illumination device such as a headlamp. The holograms are stored in memory and retrieved as necessary. However the disclosure also envisages calculation in real-time.

Known headlamps either have moving (motorised) optics or assemblies that allow the light beam to move left or right and up and down. However, such systems are extremely limiting.

Figure 4:
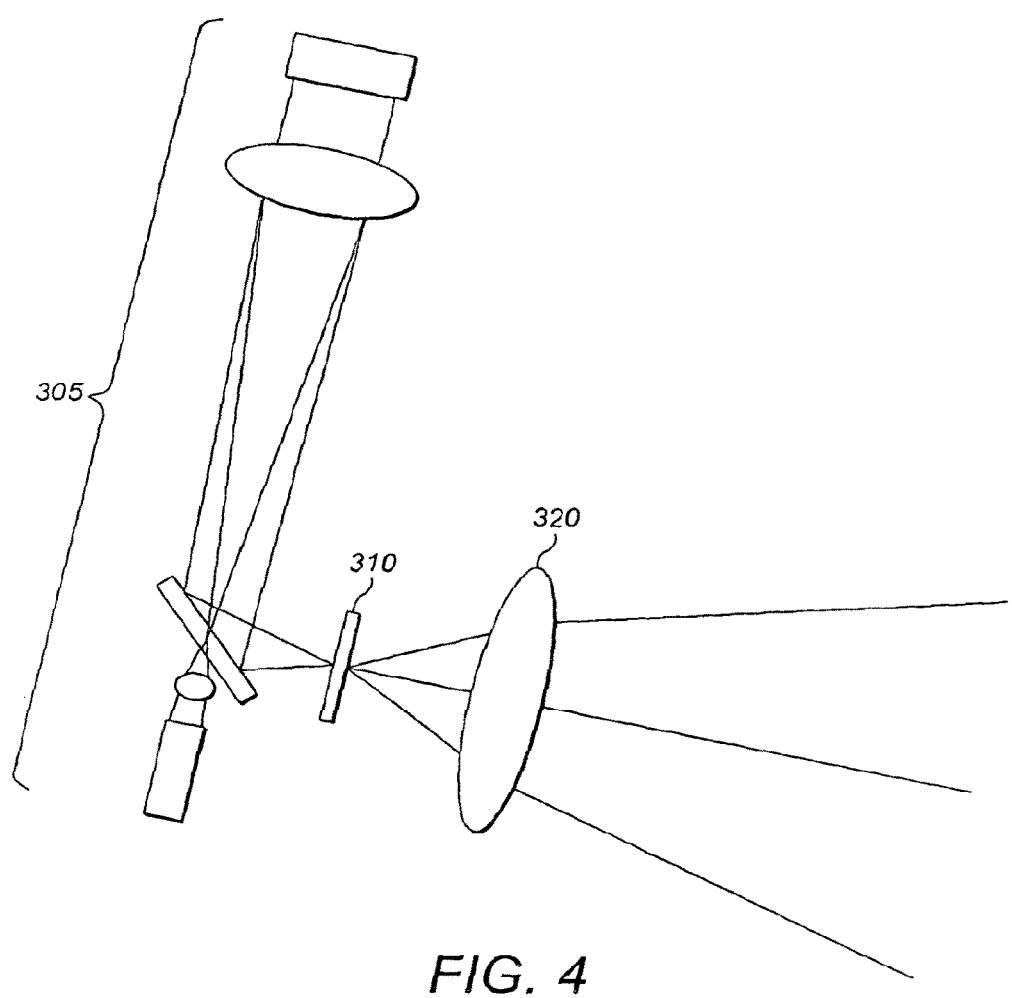
FIG. 4 shows an illumination system.

FIG. 4 shows an example in which a holographic reconstruction is projected by projection optics onto, for example, a road.

Figure 1:
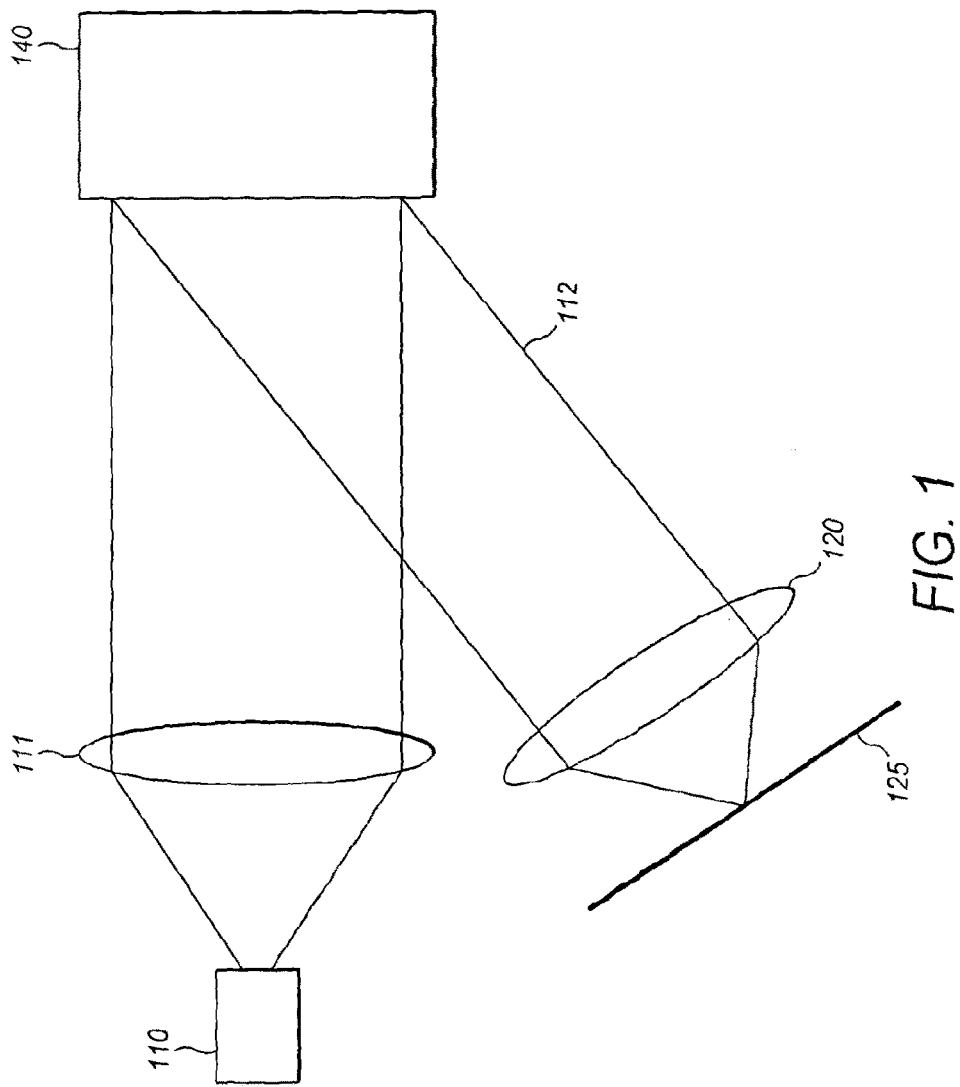
FIG. 1 is a schematic showing a reflective SLM, such as a LCOS, produce a holographic reconstruction at a replay field location.

FIG. 4 shows an illumination system (300) having an SLM-based system (305) for providing a real image of a holographic reconstruction (310). The SLM-based system (305) corresponds to FIG. 1. The holographic reconstruction (310) is formed at a so-called replay field. The holographic reconstruction is projected by a projection lens (420) on to a road, for example.

The skilled person will understand that any suitable projection optics may be used and the present disclosure is not limited to a projection lens. The projection optics may equally be a mirror, for example.

Some aspects of the optical system may be incorporated into the hologram to simplify the projection system or to aid beam conditioning.

There is therefore provided a controllable illumination device, such as a headlamp. The device can produce a light distribution, on a road for example, by projecting a holographic reconstruction.

The light distribution, or projected light, may be referred to as a "beam".

It can be understood that the projected light distribution may be moved (steered) by moving the holographic reconstruction. The image (e.g. a block of white light) may be moved from one part of the replay field to another part of the replay field. The image may be moved or nudged in any chosen direction. The skilled person will understand how to calibrate the system such that known holograms (and therefore known replay fields) correspond to known illumination patterns projected on the road. Accordingly, it can be understood that the position of the beam may be controllably adjusted.

The skilled person will understand that the headlamps of a vehicle may be operated in a so-called high (or full) beam mode, or any other mode as may be required by the driver.

In an example, there is provided a headlamp having an adjustable beam shape. This is achieved by changing the hologram—more specifically, by changing the phase delay distribution represented on/written to the spatial light modulator. In turn, this changes the holographic reconstruction (for example, the distribution of reconstructed light) and therefore the projected light distribution (or beam). In accordance with these examples, with high beam on as a car approaches, the hologram is altered to put a black out region for the oncoming driver, preventing him/her from becoming dazzled. As soon as the car has passed the full beam is restored. In some examples the beam shape is adjusted dynamically.

In other examples, the colour temperature or even the colour of the beam itself is dynamically altered according to the weather/day/night time conditions. Moreover, the colour distribution within the beam may also be controlled.

In further examples, the distribution of the beam can be altered according to road conditions, giving better visibility of the verge etc. This could be under driver control.

In examples, the beam can also be steered, left/right (for example, in response to continental/UK beam requirements), dynamically when driving round corners. The beam can also be steered up and down according to road conditions/car loading.

Advantageously, the projection optics (for example, a mirror assembly) required for examples disclosed may be cheaper to produce as a result of having dynamic control over the light distribution.

In examples, vehicle indicators are included as part of the functionality, by directing orange (red/green) light to one side of the assembly, for example. Again the hologram can do this dynamically. This side of the assembly may or may not use a diffuser to widen the light distribution angle.

In examples, the colour of the illumination in different areas of the scene is selectively altered depending upon road conditions or driver error, for example. In examples, one side of the scene is red (or any other distinguishing colour) if the driver strays over the centre of the road, for example. In examples, the indicators are presented dynamically. In further examples, street furniture or signs, for example, may be selectively and dynamically illuminated.

Further advantageously, in examples using a pixellated spatial light modulator, because of the pixellation, the higher diffraction orders (which are normally unwanted in video imaging systems, for example) could be used to create the wide angle illumination of the road.

Advantageously, as this system need not have moving parts, it can be more robust than the current systems.

In further examples, the illumination may contain infrared (IR) light also under holographic control, which may be used, for example, as part of a larger night vision system or head-up display. In examples, there is provided a holographic projection of an IR grid. Moreover, the IR system could, optionally, be used as part of a forward looking system to judge road quality (pot holes etc) allowing the suspension to adjust and allowing the headlight to compensate accordingly. The skilled person will understand how the suspension and headlight, for example, may be adjusted in response to measurements or detections made by the IR system.

In examples, the light distribution is linked to GPS (satellite navigation) to predict the lighting needs of the driver.

In one example, there is provided an auto-dimming headlamp.

Auto dipping or auto anti dazzle headlamps are already a feature on some vehicles, however the implementation is very simple: a forward looking light sensor detects the presence of oncoming main headlights. Once the light level reaches a certain level the main beams are automatically switched to dipped beams or a mechanical shutter is actuated obscuring the part of the light beam which would otherwise dazzle the driver of the oncoming vehicle. The mechanical shutter or "beam obscurer" physically blocks part of the light beam.

In an embodiment, the lighting device in accordance with the present disclosure provides a more intelligent auto-dipping or auto anti-dazzle headlamp. In an embodiment, a forward looking camera is used to recognise that a vehicle is approaching. However, the skilled person will understand that other techniques for recognising that a vehicle is approaching may be equally suitable. Even at great distance, the system in accordance with the present disclosure can start to alter the beam distribution (that is, the pattern of illumination) in view of the approaching vehicle. At a large distance, only a small amount of the beam would need to be redirected but, as the vehicle approached, the system tracks the vehicle and, in response, changes the pattern of illumination. The pattern of illumination may change in size and/shape in response to the approaching vehicle. The skilled person will understand how the pattern of illumination may be altered to reduce the impact of the pattern of illumination (e.g. reduce "dazzle") on the driver on an on-coming vehicle, for example.

As the lighting device in accordance with the present disclosure is based upon phase-only holographic techniques (i.e. a selectable phase delay distribution is applied to form phase-modulated light in the Fourier domain) light is not wastefully blocked during auto-dimming or auto anti-dazzle. Instead, a hologram (phase delay distribution pattern) is calculated and written to the phase modulator which, when illuminated, creates a light distribution which has the desired distribution (i.e. pattern of illumination). That is, for the sake of clarity, during the hologram computation process, light otherwise in the "obscured" area is redirected in to other areas of the light beam distribution. In this way, light is not simply blocked and lost from the system—as with a mechanical shutter system—but is instead directed to other parts of the pattern of illumination. Accordingly, the system is more energy efficient.

Figure 6:
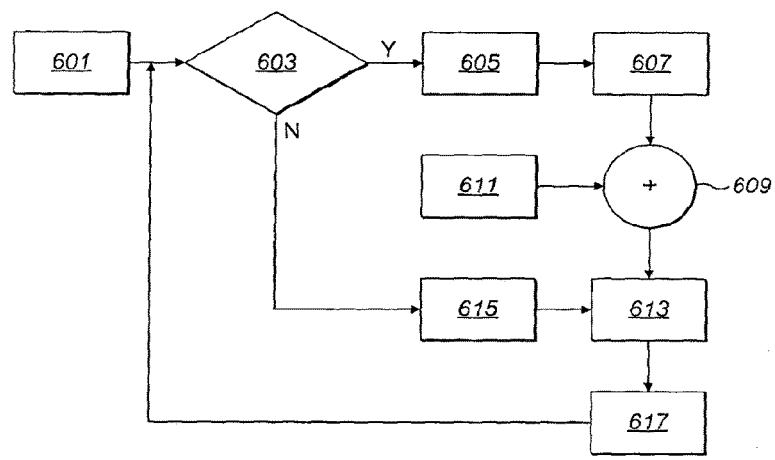
FIG. 6 is a flow chart of an embodiment for dynamically modifying a head lamp illumination profile in view of an approaching vehicle.

FIG. 6 shows an algorithm, in accordance with an embodiment, for dynamically modifying the head lamp illumination profile in view of an approaching vehicle.

In FIG. 6, there is shown a camera 601 arranged to monitor for approaching vehicles. As block 603, a determination is made as to whether an approaching vehicle has been detected. For example, block 603 may determine if the image of a headlamp (of an approaching vehicle) appears in a detected frame of a sequence of image frames from camera 601. If an approaching vehicle is not detected, "ordinary" light beam data is used to form hologram (phase delay distribution) 713. The "ordinary" light beam data 611 provides the pattern of illumination suitable for when an approaching vehicle is not present (i.e. no obscured area or areas). However, if an approaching vehicle is detected, the process moves to block 605 in which a calculation of the location of the approaching vehicle is made. The skilled person will understand that a variety of techniques may be used to determine the approximate location or proximity of an approaching vehicle from an image frame. The term "obsuration area" may be used to refer to the area which should no longer receive light from the headlamp (i.e. no longer be part of the area illuminated) because of the proximity of the approaching vehicle. In prior art methods, the "obsuration area" is the part of the light beam that would be blocked by a mechanical shutter. At block 607, a determination is made as to the size of the "obsuration area" is made based, for example, on the separation of the headlamps of the approaching vehicle. The skilled person will understand that, in other embodiments, other measurements related to the approaching vehicle may be used to determine the size of the "obsuration area". At block 609, the obsuration area is applied (such as added) to "ordinary" light beam data 611 to form a modified hologram 613 (phase delay distribution). At block 617, the phase delay distribution is applied (such as written) to the addressable spatial light modulator. The method may repeat from block 603.

There is therefore provided a method of modifying the illumination of a scene, the method comprising calculating the approximate proximity of an approaching vehicle, determining the size and shape of an obsuration area, modifying the set of phase delays on a spatial light modulator, illuminating the spatial light modulator to provide an exit beam, applying the exit beam to Fourier optics to form an image and projecting the image to provide a modified scene-illuminating beam.

Figure 7:
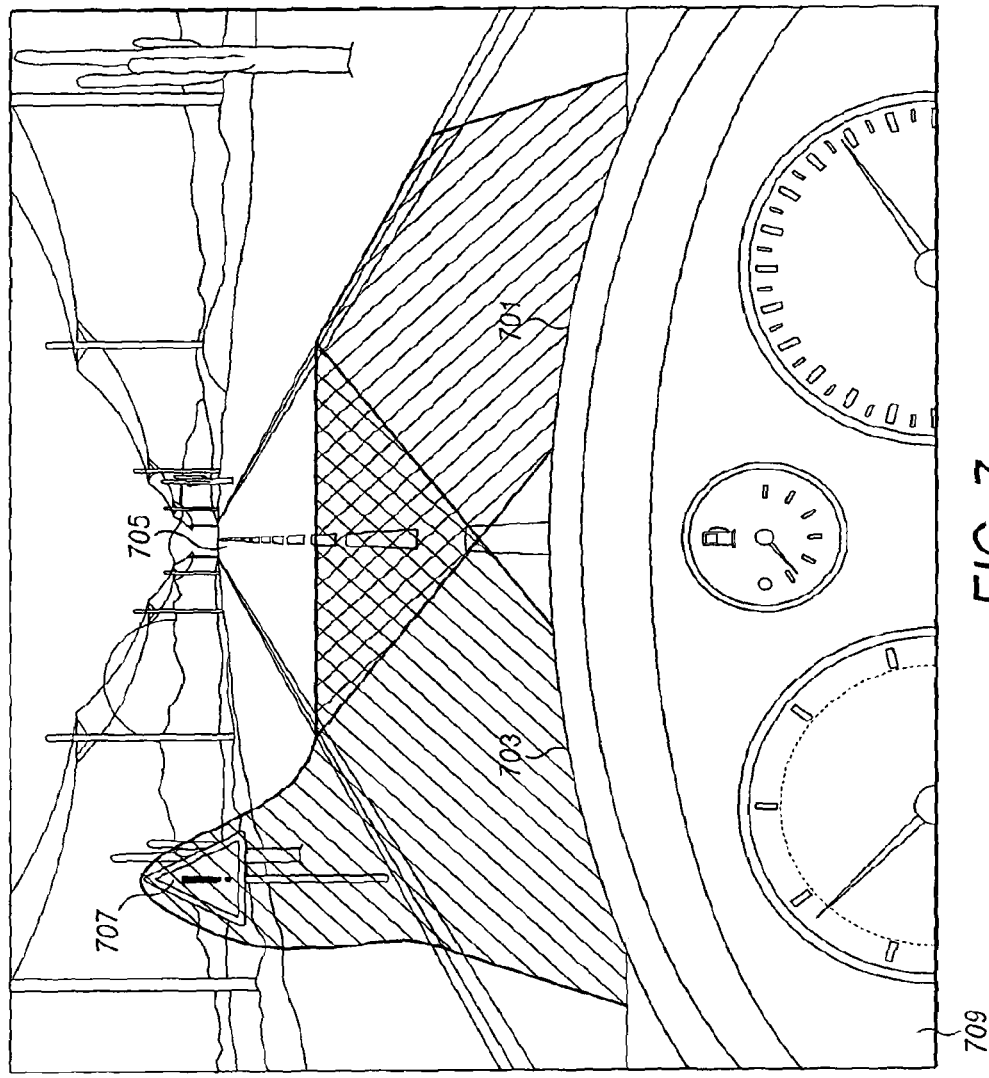
FIG. 7 shows an example system in accordance with the present disclosure for illuminating a road sign.

In another embodiment, the lighting device in accordance with the present disclosure provides an auto-highlighting illumination system. FIG. 7 shows an example in which the headlamps 701 and 703 of a vehicle 709 are used to illuminate the road 705 and, additionally, a road sign 707. In addition to the ability to redirect light to prevent dazzling the drivers of oncoming vehicles (obscuration), in an embodiment, the lighting device in accordance with the present disclosure is used to dynamically provide additionally illumination to help driver awareness of the driving environment.

Many new vehicles come fitted with road sign recognition and collision avoidance radar systems, both of these can serve as an input to the holographic calculation engine of the present disclosure. In an embodiment, the output of these systems is used so that it not only indicates what has been found, but also where in space the object can be found (that is, its proximity relative to the vehicle). The holograms (i.e. the phase delay distributions applied to the spatial light modulator) are then calculated to redirect a programmable amount of light to the specified location thereby drawing the driver's attention to the obstacle or road side information.

Figure 8:
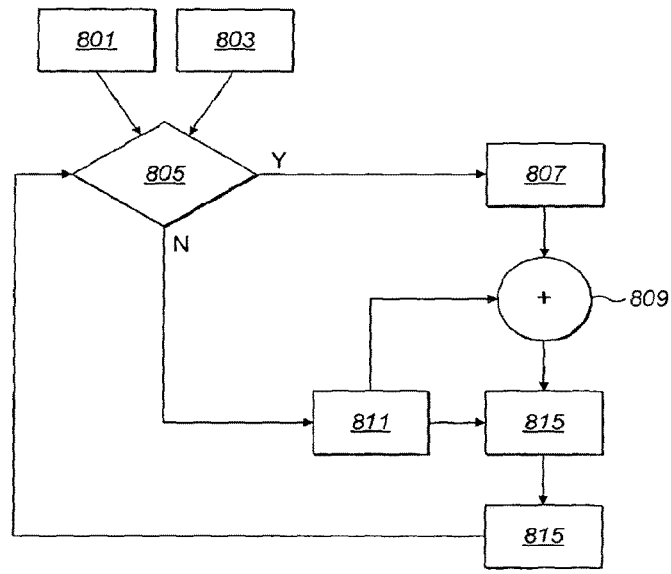
FIG. 8 is a flow chart of an embodiment for dynamic road illumination.

FIG. 8 shows a flow diagram of how this is achieved in one embodiment. At block 805, a determination is made as to whether input is received from a road sign recognition system 801 and/or a collision avoidance system 803. If input is not received at block 805, the scene is illuminated by an "ordinary" pattern of illumination. That is, "ordinary" light beam data is used to form the hologram (i.e. phase delay distribution) at block 813. If input is received at block 805, a determination is made at block 807 as to the size and distribution of the required additional illumination. The skilled person will understand that data from the road sign recognition system 801 and/or a collision avoidance system 803 may be used to determine which parts of the scene should be additional illuminated in accordance with the present disclosure. Data relating to the required additional illumination is combined (such as added) with the "ordinary" light beam data to form hologram (phase delay distribution) at block 813. The hologram is applied (such as written) to the spatial light modulator which is then illuminated to form a pattern of illumination.

There is therefore provided a method of modifying the illumination of a scene, the method comprising calculating the approximate proximity of a feature of interest in the scene, determining the size and shape of an area for additional illumination, modifying the set of phase delays on a spatial light modulator, illuminating the spatial light modulator to provide an exit beam, applying the exit beam to Fourier optics to form an image and projecting the image to provide a modified scene-illuminating beam.

In another embodiment, there is provided an improved system for dynamic road illumination.

In conventional projection style head lamps, there is a legal requirement for the light to dynamically adjust to prevent dazzling other road users. If the vehicle is tilted either forwards or backwards, a sensor is used to determine the extent of the tilt and motorised actuators alter the projection lens positions to correct the beam-pointing error. Additionally there may be a need to move from driving on the left to driving on the right. In such cases, the beam distribution and/or direction may need to be altered. Some modern vehicles have additional motorised actuators to enable such features. In embodiments, the lighting device in accordance with the present disclosure is used to provide such control.

The holographic system of the present disclosure has the same capability but with the advantage that no moving parts are required. The computation has the ability to control the direction and distribution of the light beam there by offering the ability to correct the road illumination.

In further embodiments, this functionality is extended, if the vehicle has navigation information about the geography of the road ahead, this could be fed in to the computation system thereby improving the road illumination for the driver.

A specific example of dynamic headlamps is where the headlamps of the vehicle steer left or right when cornering. Traditionally, this has been achieved by a mechanical linkage between the headlamps and the steering column, however this could equally be achieved by rotational sensing of the steering wheel and motorised control of the lights/lenses.

In embodiments, the holographic system of the present disclosure achieves the same effect: a sensor detects the rotation of the steering wheel which alters the phase delay distribution and therefore the pattern of illumination. In further embodiments, this is further enhanced by interfacing the vehicles' GPS navigation system to the holographic illumination computer. The GPS unit indicates that a bend is approaching and the holographic system allocates additional light to the approach of the corner, thereby illuminating the bend in the road before steering input has been applied.

In a further embodiment, there is provided an infra-red (IR) holographic illumination system.

In addition to the benefits that dynamic holographic illumination brings the driver for awareness of his surroundings, in an embodiment, the holographic system of the present disclosure is used to generate invisible infra-red holographic light distributions that would enable the vehicle to detect the condition of the road ahead.

In an embodiment, the system projects an IR pattern of illumination comprising a grid pattern on to the road ahead of the vehicle. A forward-looking IR camera detects the holographic IR grid. Where pot holes, road cambers etc exist, the grid would be distorted and this distortion is detected by a camera, for example. This enables the vehicle to alter its suspension settings and power distribution to enable optimal safety & comfort.

Figure 9:
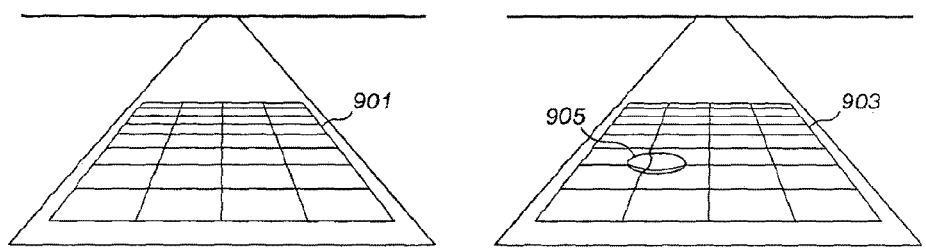
FIG. 9 shows an example infra-red grid system in accordance with embodiments.

FIG. 9 shows a first example grid 901 on a smooth road and a second example grid 903 on a road with pot holes, such as pot hole 905.

There is therefore provided a method of projecting an infra-red grid on a scene, the method comprising forming a variable set of phase delays on a spatial light modulator, illuminating the spatial light modulator with infra-red light to provide an exit beam, applying the exit beam to Fourier optics to form an infra-red image in the spatial domain comprising a grid pattern and projecting the infra-red image onto the scene. The method may further comprise capturing an image of scene and comparing the captured image with the projected infra-red image to detect abnormalities in the scene.

In another embodiment, the same IR is used as part of a Light Detection and Ranging (LIDAR) collision avoidance system. The IR wavelength is chosen such that it has greater ability to penetrate fog (reduced water absorption) there by allowing the vehicle to have greater sensing range even in reduced visibility conditions. In these embodiments, the pattern of illumination is therefore an infra-red pattern of illumination and the device further comprises detection means for detecting the pattern of illumination on the scene and processing means for identifying abnormalities in the scene by, for example, identifying differences between the detected pattern of illumination and pattern of illumination corresponding to the phase delay distribution.

As the phase only holographic system is inherently diffractive in nature, any white light source would be distributed differently as a function of its wavelength (the longer the wavelength the larger the diffraction angle). Therefore, in an embodiment, the holographic system is used to correct this chromatic variation. In further embodiments, the system is also used to manipulate the ratios of the wavelengths (thereby altering the colour of the light) either for the entire beam or for selective portions of the beam.

For example it may be better when driving in fog to have a headlamp with a yellow hue, the holographic system of the present disclosure could be used to dynamically attenuate the blue content of the white light source.

In yet further embodiments, this concept is further extended, so that the main head lamps act as indicators. In a small portion of the main beam, the wavelength distribution alternates between, for example, orange and white by dynamically attenuating the blue & green wavelengths in the specified region of the main beam. Given that all these parameters are under software control if affords the designer of the illumination system great flexibility and power to optimise the total illumination output for all driving conditions.

Unlike video projection systems, for instance, examples of the present disclosure do not require the holographic reconstruction or projected image to be a high quality image. The light source for the spatial light modulator therefore only needs to be at least partially coherent. For example, in examples, the light source may therefore comprise at least one light emitting diode. In examples, the light source may comprise at least one laser. The skilled person will understand that other light sources may be equally suitable.

The spatial light modulator may be transmissive or reflective. That is, the phase modulated light may be output from the spatial light modulator in transmission or reflection.

The holographic reconstruction (or image) may be affect by the so-called zero order problem which is a consequence of the diffractive nature of the reconstruction. Such zero-order light is usually regarded as "noise" and includes for example specularly reflected light, and other unwanted light from the SLM.

This "noise" is generally focussed at the focal point of the Fourier lens, leading to a bright spot at the centre of a reconstructed hologram. Conventionally, the zero order light is simply blocked out however this would clearly mean replacing the bright spot with a dark spot.

However, in examples, the zero order (or DC spot, which is also normally unwanted) is used to contribute to the centre of the light beam. For example, zero order may be advantageously used to provide greater illumination at the centre of the beam.

As the hologram contains three dimensional information, it is possible to displace the reconstructed hologram into a different plane in space—see, for example, published PCT application WO 2007/131649 incorporated herein by reference.

Whilst examples described herein relate to displaying one hologram per frame, the present disclosure is by no means limited in this respect and more than one hologram may be displayed on the SLM at any one time.

For example, examples implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zero diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. Taking the example of a Fourier transform of an infinite sine wave, a single frequency is produced. This is the optimum output. In practice, if just one tile is used, this corresponds to an input of a single phase of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

The present disclosure is not limited to monochromatic projection or illumination.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce a composite colour reconstruction. The colours are cycled (red, green, blue, red, green, blue, etc.) at a fast enough rate such that a human viewer sees a polychromatic image from a combination of the three lasers. Each hologram (phase delay distribution on the spatial light modulator) is therefore colour-specific. For example, the first "frame" may be produced by firing the red laser for $1/75^{th}$ of a second, then the green laser would then be fired for $1/75^{th}$ of a second, and finally the blue laser would be fired for $1/75^{th}$ of a second.

An alternative method, that will be referred to as "spatially separated colours" (SSC) involves all three lasers being fired at the same time, but taking different optical paths, e.g each using a different SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

As can be understood from the foregoing, the light source may comprise at least one infra-red light source, for example.

In examples, the spatial light modulator is a reflective Liquid Crystal over Silicon (LCOS) device. LCOS devices are a hybrid of traditional transmissive liquid crystal display devices, where the front substrate is glass coated with Indium Tin Oxide to act as a common electrical conductor. The lower substrate is created using a silicon semiconductor process with an additional final aluminium evaporative process being used to create a mirrored surface, these mirrors then act as the pixel counter electrode. Such SLMs can be formed to have a fill factor of better than 90 percent.

LCOS devices are now available with pixels between 4.5 μm and 12 μm. The necessary size is determined by the application to which the sLM is to be put, the mode of operation and therefore the amount of circuitry that is required at each pixel.

Figure 5:
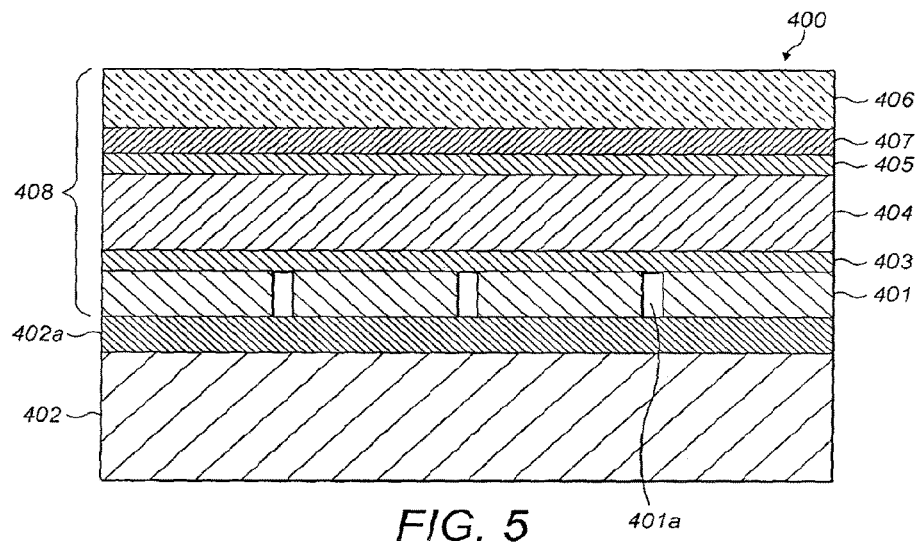
FIG. 5 is a schematic of a LCOS SLM.

The structure of an LCOS device is shown in FIG. 5.

A LCOS device is formed using a single crystal silicon substrate (402). It has a 2D array of square planar aluminium electrodes (401), spaced apart by gaps (401a), arranged on the upper surface of the substrate. Each of the electrodes (401) is connected to circuitry (402a) buried in the substrate (402) to allow addressing of each electrode. Each of the electrodes forms a respective planar mirror. An alignment layer (403) is disposed on the array of electrodes, and a liquid crystal layer (404) is disposed on the alignment layer (403). A second alignment layer (405) is disposed on the liquid crystal layer (404) and a planar transparent layer (406), e.g. of glass, is disposed on the second alignment layer (405). A single transparent electrode (407) e.g. of ITO is disposed between the transparent layer (406) and the second alignment layer (405).

Each of the square electrodes (401) defines, together with the overlying region of the transparent electrode (407) and the intervening liquid crystal material, a controllable phase-modulating element (404), often referred to as a pixel. The effective pixel area, or fill factor, is the percentage of the total pixel which is optically active, taking into account the space between pixels (401a). By control of the voltage applied to each electrode (401) with respect to the transparent electrode (407), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer is half the thickness that it would be if a transmissive device were used. This greatly improves the switching speed of the liquid crystal A LCOS device is also uniquely capable of displaying large arrays of phase only elements in a small aperture. Small elements (typically approximately 10 microns) result in a practical diffraction angle (a few degrees).

It is easier to adequately illuminate the small aperture (a few square centimeters) of a LCOS SLM than it would be for the aperture of a larger liquid crystal device. LCOS SLMs also have a large aperture ratio, there is very little dead space between the pixels (as the circuitry to drive them is buried under the mirrors). This is an important issue to lowering the optical noise in the replay field.

The above device typically operates within a temperature range of 10° C. to around 50° C.

As a LCOS device has the control electronics embedded in the silicon backplane, the Fill factor of the pixels is higher, leading to less unscattered light leaving the device.

Using a silicon backplane has the advantage that the pixels are optically flat, which is important for a phase modulating device.

Whilst examples relate to a reflective LCOS SLM, the skilled person will understand that any SLM can be used including transmissive SLMs.

The disclosure has been put in the context of vehicle headlamps but is of course applicable to other devices for lighting purposes, such as search lights, torches and the like.

The invention is not restricted to the described examples but extends to the full scope of the appended claims.

The invention claimed is:

1. A lighting device arranged to produce a controllable light beam for illuminating a scene, the controllable light beam having an angle of illumination, the device comprising:
   an addressable spatial light modulator arranged to provide a selectable phase delay distribution to a beam of incident light;
   Fourier optics arranged to receive phase-modulated light in a first diffraction order and in one or more higher diffraction orders from the spatial light modulator and form a light distribution; and
   projection optics arranged to project the light distribution to form a pattern of illumination as said controllable light beam,
   wherein the spatial light modulator is a pixelated spatial light modulator and the device is arranged to widen the angle of illumination by using the first diffraction order and the one or more higher diffraction orders of the spatial light modulator.

2. The lighting device of claim 1, wherein the projection optics magnify the pattern of illumination.

3. The lighting device of claim 1, wherein the phase delay distribution comprises a representation of the pattern of illumination in the Fourier domain.

4. The lighting device of claim 1, wherein the pattern of illumination is in the spatial domain.

5. The lighting device of claim 1, wherein the Fourier optic is arranged to perform a time-space transformation.

6. The lighting device of claim 1, wherein the Fourier optic is a Fourier lens.

7. The lighting device of claim 6, wherein the Fourier lens has a short focal length.

8. The lighting device of claim 1, wherein the spatial modulator is reflective.

9. The lighting device of claim 1, wherein the spatial light modulator is a liquid crystal on silicon device.

10. The lighting device of claim 1, further comprising a diffuser on the side of the device to further widen the angle of illumination.

11. The lighting device of claim 1, wherein the device is a headlamp.

12. A method of illuminating a scene, the method comprising:
    forming a variable set of phase delays on a pixelated spatial light modulator;
    illuminating the spatial light modulator to provide an exit beam, the exit beam comprising light in a first diffraction order of the spatial light modulator and light in one or more higher diffraction orders of the spatial light modulator;
    applying the exit beam comprising the light in the first diffraction order and the light in the one or more higher diffraction orders to Fourier optics to form an image; and
    projecting the image to provide a scene-illuminating beam having an angle of illumination widened by the first diffraction order and the one or more higher diffraction orders of the spatial light modulator.

13. The method of claim 12, further comprising selecting the set of phase delays to steer the scene illuminating beam.

14. The method of claim 12, further comprising changing the set of phase delays to change the beam shape.

15. The method of claim 12, further comprising reading a pre-calculated set of phase delays from a memory and using the pre-calculated set of phase delays as the variable set of phase delays on the pixelated spatial light modulator.

16. The method of claim 12, wherein the step of illuminating the spatial light modulator to provide an exit beam comprises illuminating the spatial light modulator with infra-red light.

17. The method of claim 12, wherein the step of illuminating the spatial light modulator to provide an exit beam comprising illuminating the spatial light modulator with polychromatic light.

18. The method of claim 12, further comprising dynamically changing the colour temperature of the scene-illuminating beam.

* * * * *